UNITED STATES PATENT OFFICE.

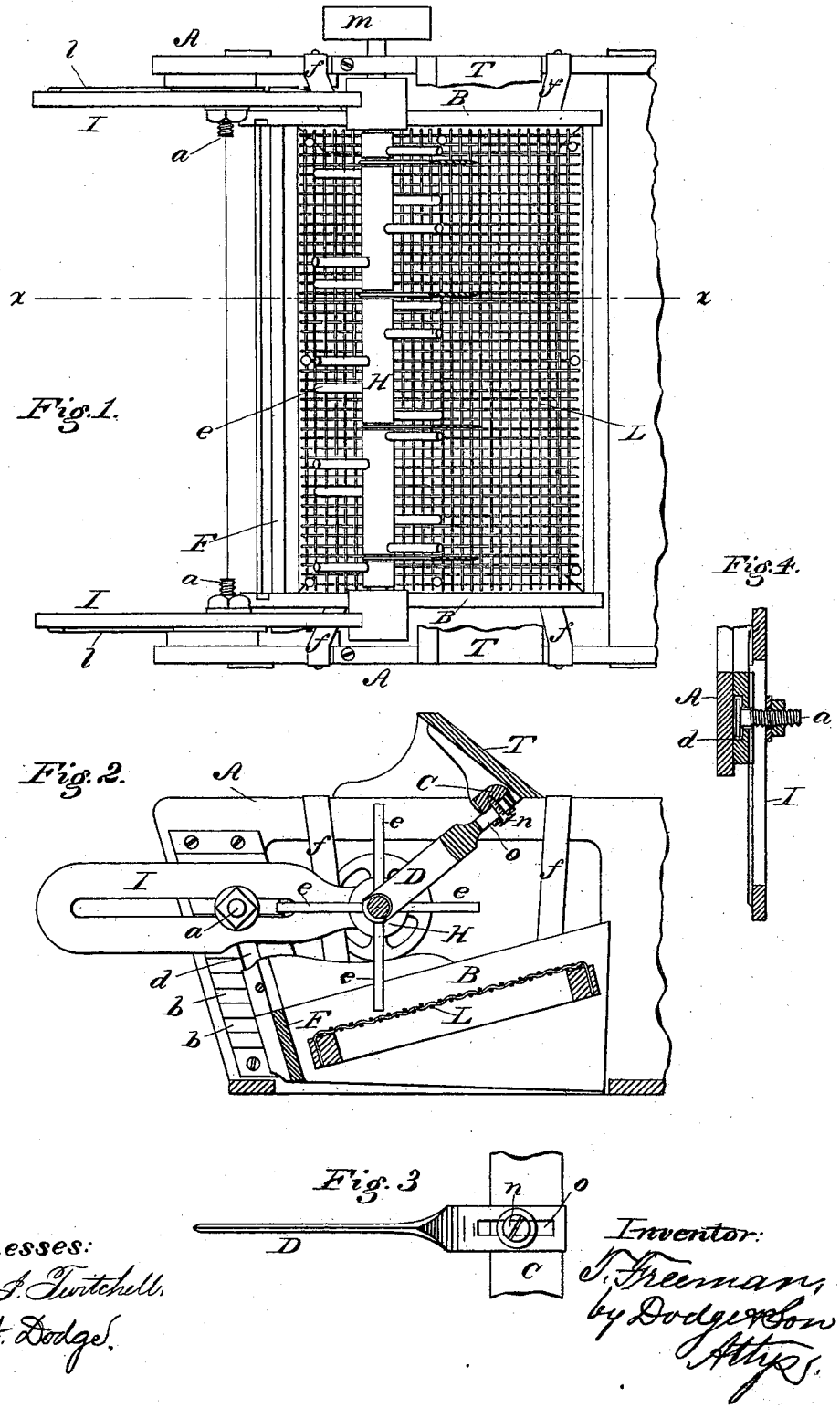

THOMAS FREEMAN, OF ROCHESTER, MINNESOTA.

IMPROVEMENT IN GRAIN-SEPARATORS.

Specification forming part of Letters Patent No. 185,175, dated December 12, 1876; application filed April 10, 1876.

*To all whom it may concern:*

Be it known that I, THOMAS FREEMAN, of Rochester, in the county of Olmsted and State of Minnesota, have invented certain Improvements in Thrashing-Machines, of which the following is a specification:

My invention consists of a revolving shaft provided with arms and a series of fixed blades, to be used in connection with a thrashing-machine for the purpose of clearing the grain-sieves from straw, &c., all as hereinafter more fully described.

Figure 1 is a top-plan view, a portion being broken away. Fig. 2 is a longitudinal vertical section on the line $x\,x$ of Fig. 1, and Figs. 3 and 4 are portions shown in detail.

In thrashing-machines as ordinarily constructed there is always more or less difficulty caused by the sieves becoming clogged with straw, chaff, and other material, in consequence of which the passage of the grain through them is impeded, and more or less of the grain is carried over the tail-board along with the straw and accumulating or obstructing material, and is thereby wasted or lost.

It is to remedy this difficulty that my invention is designed, and it consists of the following features:

In the drawings, A represents the rear end of that portion of a thrasher in which the sieves are placed, and in which is hung the vibrating shoe B, suspended by rods $f$, and carrying one or more sieves, L. Across the frame at the top is mounted loosely a bar, C, Fig. 2, to which is connected a series of blades, D, which are slotted at the end attached to the bar, and are secured by a bolt or set-screw, $n$, as shown in Figs. 2 and 3, whereby they may be adjusted as desired. At their opposite ends these blades D are journaled upon a shaft, H, as shown in Fig. 2, this shaft being provided with a series of radial arms, $e$, and mounted at its ends in two adjustable arms or supports, I, as shown in Figs. 1 and 2. This shaft H projects through the side of the case A at one end, and is provided with a pulley, $m$, Fig. 1, by which it may be driven by a belt from any portion of the operating mechanism, though, of course, it may be driven in any other manner, if preferred.

The arms I, which support the shaft H, are slotted longitudinally, as shown in Fig. 2, and are held by a bolt, $a$, the head of which moves vertically in a slot, $d$. (Shown in detail in Fig. 4.)

On their outer faces these arms I are provided with a longitudinal rib, $l$, to fit in corresponding grooves $b$, Fig. 2, so that by releasing the nut on bolts $a$ these arms I can be adjusted and firmly clamped at any desired height, and this, together with their longitudinal adjustment by means of their slots, enables the shaft H to be adjusted, as desired, in relation to the sieve L, either higher or lower, or farther forward or back.

The blades D, as represented in Fig. 3, are made with a sharp edge, the object being to cut any straw that may chance to become attached to the shaft H or its arms $e$ as they revolve.

The shoe B, at its rear end, is provided with a tail-board, F, which I make much wider or higher than usual, and which is adjustable vertically in gains or grooves in the side-boards of the shoe, as shown in Fig. 2.

The operation of the apparatus will be readily understood. As the shaft H revolves its arms $e$ will remove from the sieve all the straw, chaff, and rubbish that would otherwise accumulate thereon, thus keeping the sieve clear, and permitting the free passage of the grain through or from the same at its rear end.

By means of this sieve-cleaning apparatus I am enabled to use a much wider or higher tail-board in the rear end of the shoe B, as the arms $e$ of the rotating shaft lift the straw and rubbish and force it over the tail-board F, whereas, if there were no such clearing apparatus, such a high or wide tail-board could not be used, as it would cause the straw, chaff, &c., to remain on the sieve and clog it, thereby preventing the free passage of the grain.

As is obvious, this improvement is applicable to all styles of thrashers which have a grain-cleaning apparatus attached.

Having thus described my invention, what I claim is—

1. The rotating shaft H, provided with a series of arms, $e$, in combination with the vertically-inclined blades D, all arranged in relation to the shoe of a grain-clearing apparatus in a thrashing-machine, substantially as shown and described.

2. In combination with the shaft H, the vertically and longitudinally adjustable arms or supports I, whereby the shaft can be adjusted in relation to the sieve L, substantially as described.

THOMAS FREEMAN.

Witnesses:
T. H. TITUS,
A. S. CLARK.